UNITED STATES PATENT OFFICE.

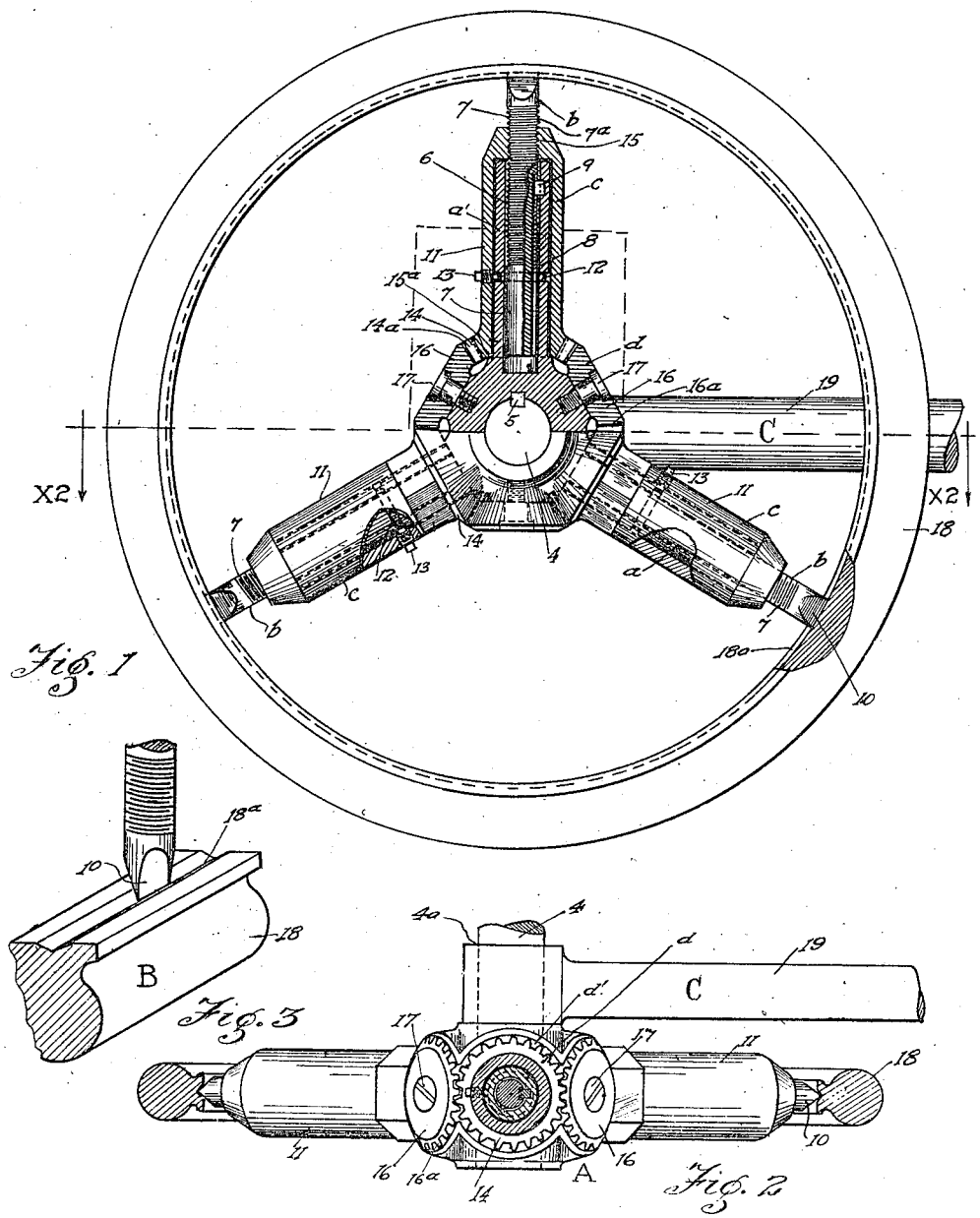

HOWARD I. MORRIS, OF SAN DIEGO, CALIFORNIA, ASSIGNOR TO THE SAVAGE TIRE COMPANY, OF SAN DIEGO, CALIFORNIA, A CORPORATION OF CALIFORNIA.

TIRE-CARCASS-SUPPORTING MEANS.

1,268,482.   Specification of Letters Patent.   Patented June 4, 1918.

Application filed October 13, 1916. Serial No. 125,527.

*To all whom it may concern:*

Be it known that I, HOWARD I. MORRIS, a citizen of the United States, residing at San Diego, in the county of San Diego and State of California, have invented new and useful Improvements in Tire-Carcass-Supporting Means, of which the following is a specification.

This invention relates to tire carcass supporting means, and it has for its object to provide means of the general character stated which will properly support tire carcasses and the like, and from which said tire carcass, together with features of the apparatus, such as tire cores, may be readily removed to the end that a tire may be speedily replaced by another tire during the manufacture of the same or a tire core may be speedily replaced by another in position for certain operations necessary in tire manufacture, such as building up the carcass, treading the same etc. In a broader aspect, the invention contemplates the provision of an expansible chuck or the like, the extensible or expanding portions of which may be caused to be extended or moved to expanded position by a simple movement of a portion of the chuck. In manufacturing the casings of pneumatic tires, a core about which the tire carcass is built is ordinarily employed, the carcass remaining on said core during succeeding tire building operation and the core is usually transferred through successive stages in the manufacture of the casing, and the herein disclosed chuck is particularly adapted to be readily engaged with successive cores as they are presented to the zone of a particular operation on the tire and in which zone said chuck is, usually rotatably, mounted.

In accordance with the invention, a plurality of radially extensible members are provided, each of which may be adapted to take into a suitable recess provided in a core or the like, and all of said members being mounted for joint rotation about a central axis and connected together for joint movement, preferably in such a manner that by rotation of a suitable grip or nut portion one of which may be provided on or at each of the extensible members, all of the extensible members will be moved to extended or contracted position according to the direction of movement of the grip or nut portion. Therefore, when a device organized in accordance with the invention is installed in position for service, cores or other members with which the chuck is adapted to co-act, may be speedily applied to the chuck and removed therefrom, being supported thereby during the period of time required for the particular operation or work being done on the tire being formed on the core or the like.

In the specific form of the invention illustrated, a central hub carries a plurality of radial arms, in each of which a telescopic member is provided and keyed against rotation, and an external member is rotatably mounted on said arm and has threaded engagement with said telescopic member, whereby upon rotation of the external member, which is keyed against endwise movement, the telescopic member may be projected from its housing in the arm or retracted into the arm. Means, shown as bevel gears, are provided between adjacent rotatable members to cause the uniform and simultaneous rotation of all of the external members when one of such members is rotated.

With the above and other objects in view, including relative simplicity and inexpensiveness in construction and organization, the invention consists in the novel and useful provision, formation, combination, association and inter-relation of parts, members and features all as hereinafter described shown in the drawing, and finally pointed out in claims.

Figure 1 is a side elevation of tire-carcass supporting means constructed and organized in accordance with the invention, parts being broken away and sectioned for clearness of illustration;

Fig. 2 is a horizontal sectional view of the showing in Fig. 1, taken on line $x^1$—$x^1$, Fig. 1, and looking in the direction of the appended arrows; and Fig. 3 is a perspective view of a fragment of the core shown in the other figures, a fragment of a member likewise shown in the other figures being shown as in engagement therewith, the view being taken upon an enlarged scale.

Corresponding parts in all the figures are designated by the same reference characters.

Referring with particularity to the drawing, the improved tire-carcass supporting means shown therein comprises a rotatably mounted chuck A, a core B supported thereby, and a supporting member C whereby the chuck is rotatably supported in convenient position for tire finishing or other operations, the chuck A comprising a central hub portion $a$ having a plurality of radial arms $a'$ formed thereon, a plurality of radial extensible members $b$, means $c$ for operating each of the extensible members $b$, and means $d$ disposed between adjacent operating members $c$ whereby movement of one of said operating members is accompanied by movement of all of the others of said operating members. The hub $a$ may be keyed to a shaft 4 as at 5 and the same may be formed to provide recesses $d'$ in each of which a means $d$ or features associated therewith is disposed. The arms $a'$ may all be formed integral with the hub $a$ and each provided with a radial bore as at 6 into each of which bores a member $b$ is fitted and adapted to be radially moved. Each of the members $b$ preferably comprises a threaded rod 7 provided with a longitudinal key-way 8 into which takes a key 9 provided interiorly of the respective arm $a'$ to prevent rotation of the rod 7. Each of the rods 7 is provided with a wedge-shaped point as at 10 the thin edge of said wedge lying in the plane of chuck rotation. Each of the operating means $c$ comprises a tubular sleeve 11 rotatably mounted on the respective arm $a'$ such arm being preferably cylindrical and provided with a circumferential groove 12 into which a threaded pin 13 passed through the member $c$ takes and whereby longitudinal movement of the member $c$ is prevented. The end of the tubular member $c$ adjacent the hub preferably terminates in an inwardly facing beveled pinion 14 which abuts against a suitable shoulder $15^a$ formed on the hub at the base of the respective arm $a'$ and in a recess formed in the hub as will hereinafter be described.

These bevel pinions are comprised within or associated with the means $d$. The outer end of the member $c$ is internally threaded as at 15 to match the threads $7^a$ on the threaded rod 7. The means $d$ in addition to the bevel pinions formed on the ends of the tubular members $c$ may comprise, in each instance, an inwardly facing bevel pinion 16 one of which is disposed between each of the members $c$ and the next adjacent member $c$ each such bevel pinion being rotatably secured to the hub by a threaded pin or stud 17 passed through a suitable bore in the respective bevel pinion 16 and into the hub $a$. In the specific device illustrated, three arms $a'$ are shown, each disposed at an angle of 120 degrees to the other two of such arms, and the flat shoulder 15 at the base of each of said arms has in superficial contact therewith an inwardly facing bevel pinion face provided on the respective bevel pinion 14 and each said shoulder is located in a recess $d'$, the bottoms of alternate recesses $d'$ being preferably flat and each adapted to have held in superficial contact therewith one of the bevel idler pinions 16, this disposition of pinions in recesses in the hub providing a hub which acts as a guard means, guarding against accidental catching of the fingers or clothing of the operator in the teeth $14^a$ of the bevel pinions 14 and the teeth $16^a$ of the bevel pinions 16.

The core B is shown as consisting of an annulus 18 of suitable material preferably of suitable cross section to provide for the proper building or finishing of a tire thereon. An internal wedge-shaped groove $18^a$ is formed in the inner face of the annulus, the wedge-shaped points 10 of the rods 7 taking into such groove $18^a$ when the chuck is in expanded position and thus mounting and supporting the core B for rotation. The support C is shown as an arm 19 of a tire finishing machine in which the shaft is rotatably supported as at $4^a$ so that by application of power or by manual manipulation the core and the chuck may be rotated about the axis of the shaft 4. In certain instances it may be desirable to fix the shaft 4 in a suitable mounting and provide for rotation of the hub $a$ thereon, all as will be readily understood by persons skilled in the art to which this invention appertains.

The provision of the wedge-shaped point 10 on the ends of the rods 7 and the wedge-shaped groove $18^a$ continuously along the groove at the inner edge thereof provides for proper engagement as between the chuck A and the core the core being properly centered when the chuck is expanded and the wedge formations 10 properly gripping the core and preventing slippage and consequent wear of parts when the chuck is driven by power.

The operation, method of use and advantages of the invention will be readily understood from the foregoing description, taken in connection with the accompanying drawing and the following statement:

Assuming the parts to be in the position shown in the drawing, when it is desired to remove the core, as when a tire carcass has been completed thereon, all that is necessary is to rotate one of the members $c$, as by manually twisting or rotating the same about its arms $a'$, thus causing the joint rotation through the intermediate bevel pinions, which are in engagement with the bevel pinions formed on the members $c$, of all of the others of such members $c$, such rotation of the members $c$ in the proper direction, drawing inwardly the rods 7 constituting the members $b$ and thus releasing the core B. The core B may be replaced or a further core B may be placed on the chuck A by positioning the same with its groove $18^a$ in registration with the points 10 of the rods 7 and rotating one of the members $c$ in the direction opposite that in which it was rotated to release the core previously supported. This rotation being imparted to all of the members c simultaneously through the intermediate bevel pinion 16 will cause the expansion or radial extension of the rods 7, the points entering the groove 18ª in the core, and the desired degree of pressure being applied, work may be done on the tire supported by or built upon the core. It will be understood that the rods 7 are forced outwardly or drawn inwardly, according to the direction of the rotation of the members c, due to the threaded engagement of such members with the respective rods as the rods 7 are prevented from rotating by the key 9 but may travel radially of the chuck due to the provision of the slot or key-way 8 therein, while the members c are each confined to a rotatory path of movement by reason of their pins 7 taking into the respective slots 12.

It is manifest that many variations may be made from the specific disclosure herein and many useful applications of the chuck to work other than tire carcass core supporting may be made, all without departing from the spirit of the invention and the terms of the following claims.

Having thus disclosed my invention, I claim and desire to secure by Letters Patent:

1. In a device of the character disclosed, a plurality of outwardly extensible members, a core adapted to be engaged by said members, and means for simultaneously outwardly extending all of said members for engagement with said core, including manually operable members each of which is associated with one of said extensible members and adapted for direct manual operation.

2. In a device of the character disclosed, a plurality of outwardly extensible members, a core adapted to be engaged by said members, and means for simultaneously outwardly extending all of said members for engagement with said core; said means comprising a plurality of rotatable operating members adapted for joint rotation through direct manual operation of one of said rotatable members.

3. In a device of the character disclosed, a plurality of outwardly extensible members, a core adapted to be engaged by said members, and means for simultaneously outwardly extending all of said members for engagement with said core; said means comprising a plurality of rotatable operating members adapted for joint rotation through direct manual operation of one of said rotatable members and each associated with one of said extensible members.

4. In a device of the character disclosed, a plurality of outwardly extensible members, a core adapted to be engaged by said members, and means for simultaneously outwardly extending all of said members for engagement with said core; said means comprising a plurality of rotatable operating members adapted for joint rotation through direct manual operation of one of said rotatable members and each associated with one of said extensible members; said extensible members each being formed with a wedge-shaped point for engagement with the core.

5. In a device of the character disclosed, a plurality of outwardly extensible members, a core adapted to be engaged by said members, and means for simultaneously outwardly extending all of said members for engagement with said core; said means comprising a plurality of rotatable operating members adapted for joint rotation through direct manual operation of one of said rotatable members and each associated with one of said extensible members; said members each being formed with a wedge-shaped point for engagement with the core, and said core being formed with a slot adapted to receive said wedge-shaped points.

6. In a device of the character disclosed, a hub, a suitable support upon which said hub is rotatably mounted, extensible members carried by said hub and adapted for co-engagement with a core, and means which is operably associated with each and with all of said members and adapted for direct manual operation at any one of said members for simultaneously extending or retracting all of said extensible members including actuating means associated with each extensible member and adapted for direct manual operation.

7. In a device of the character disclosed, a plurality of outwardly extensible members, a core, adapted to be engaged by said members, and means for extending all of said members simultaneously for engagement with said core comprising a plurality of directly manually operable operating members one associated with each of said extensible members, and means of operative connection whereby all of said operating members are actuated upon actuation of one of said operating members.

8. In a device of the character disclosed, a suitable support, a hub mounted for rotation with respect to said support, and having a plurality of radial arms, a core, a member associated with each of said arms and adapted for retraction and for extension so as to engage said core, and a plurality of directly manually operable means mounted one on each of said arms whereby the respective member associated therewith may be projected to engage the core; there being means of connection between said operating members and all of the others of said operating members whereby when one of said operating members is actuated all of the others of said members will be simultaneously similarly actuated.

9. In a device of the character disclosed, a suitable support, a hub mounted upon said support, a core, a plurality of radially extensible members for engagement with said core, arms provided on said hub and housing said extensible members, and directly manually operable means mounted on each of said arms for projecting said extensible members so as to engage them with the core, each of said extensible members having threaded engagement with the respective means for extending the same.

10. In a device of the character disclosed, a suitable support, a hub mounted upon said support, a core, a plurality of radially extensible members for engagement with said core, arms provided on said hub and housing said extensible members, and directly manually operable means mounted on each of said arms for projecting said extensible members so as to engage them with the core, each of said extensible members having threaded engagement with the respective means for extending the same; there being means connecting all of said extending means whereby actuation of one of said extending means causes the actuation of all of the others of said extending means.

11. In a device of the character disclosed, a suitable support, a hub having a plurality of radially extending arms and being rotatably mounted on said support, a non-rotatable extensibly threaded member mounted in each of said arms and adapted to engage a core when extended, a core adapted to be engaged by said extensible members, a plurality of directly manually operable sleeves each rotatably mounted on one of said arms and having a threaded engagement with the respective threaded member in said arm, means for preventing radial movement of said rotatable members, and means of operative connection whereby all of said rotatable members are jointly rotated upon rotation of one of said rotatable members to cause simultaneous extension of all of said non-rotatable members and engagement of said non-rotatable members with the core.

12. In a device of the character disclosed, a suitable support, a hub having a plurality of radially extending arms and being rotatably mounted on said support, a non-rotatable extensible threaded member mounted in each of said arms and adapted to engage a core when extended, a core adapted to be engaged by said extensible members, a plurality of directly manually operable sleeves each rotatably mounted on one of said arms and having a threaded engagement with the respective threaded member in said arm, means for preventing radial movement of said rotatable members, and means of operative connection whereby all of said rotatable members are jointly rotated upon rotation of one of said original members to cause simultaneous extension of all of said non-rotatable members and engagement of said non-rotatable members with the core, including pinions housed in recesses in said hub.

In testimony whereof, I have signed my name to this specification in the presence of two subscribing witnesses.

HOWARD I. MORRIS.

Witnesses:
CLAUS SPRECKEL,
H. N. MABERY.